April 5, 1966 R. S. CARTER ETAL 3,245,048
COMPUTER CLOCK PHASE LOCK
Filed Dec. 23, 1963 7 Sheets-Sheet 1
FIG. 1 ERROR STOP
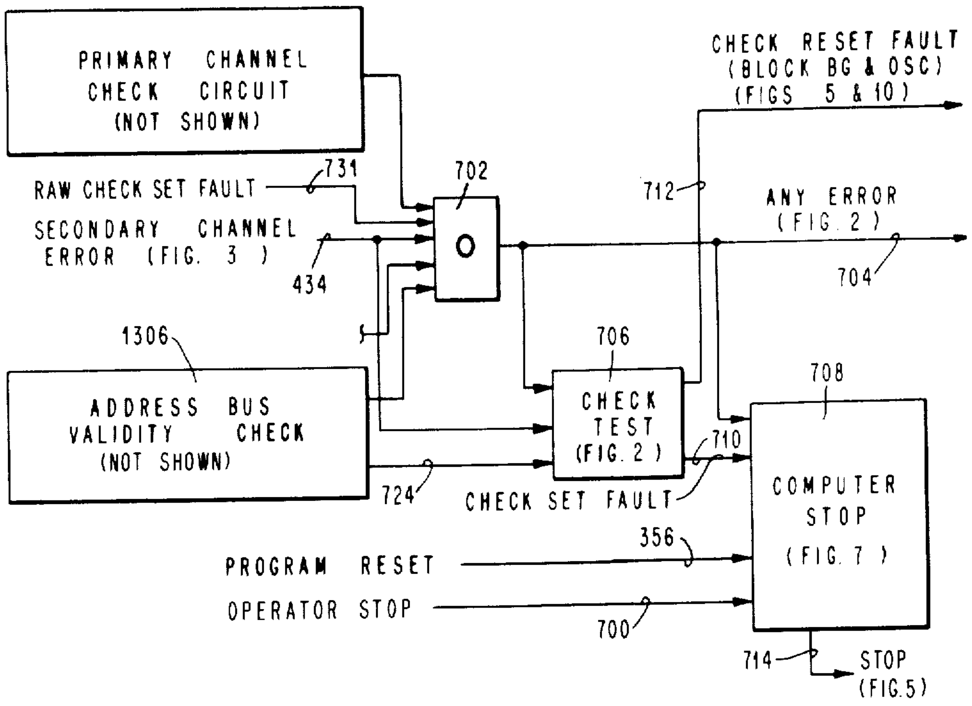
FIG. 2 CHECK TEST
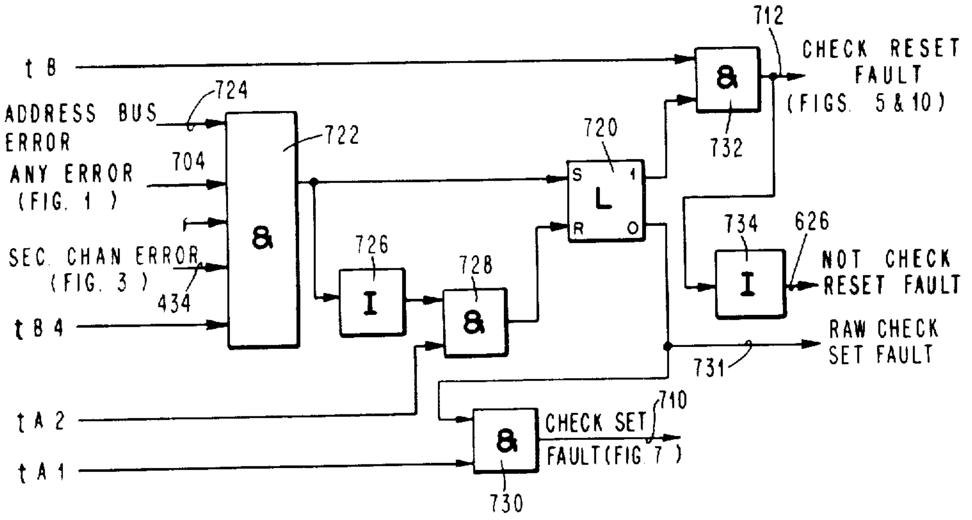

BASIC TIMING CHART

OSCILLATOR

April 5, 1966 R. S. CARTER ETAL 3,245,048

COMPUTER CLOCK PHASE LOCK

Filed Dec. 23, 1963 7 Sheets-Sheet 4

FIG. 8 MAIN CYCLE CLOCK
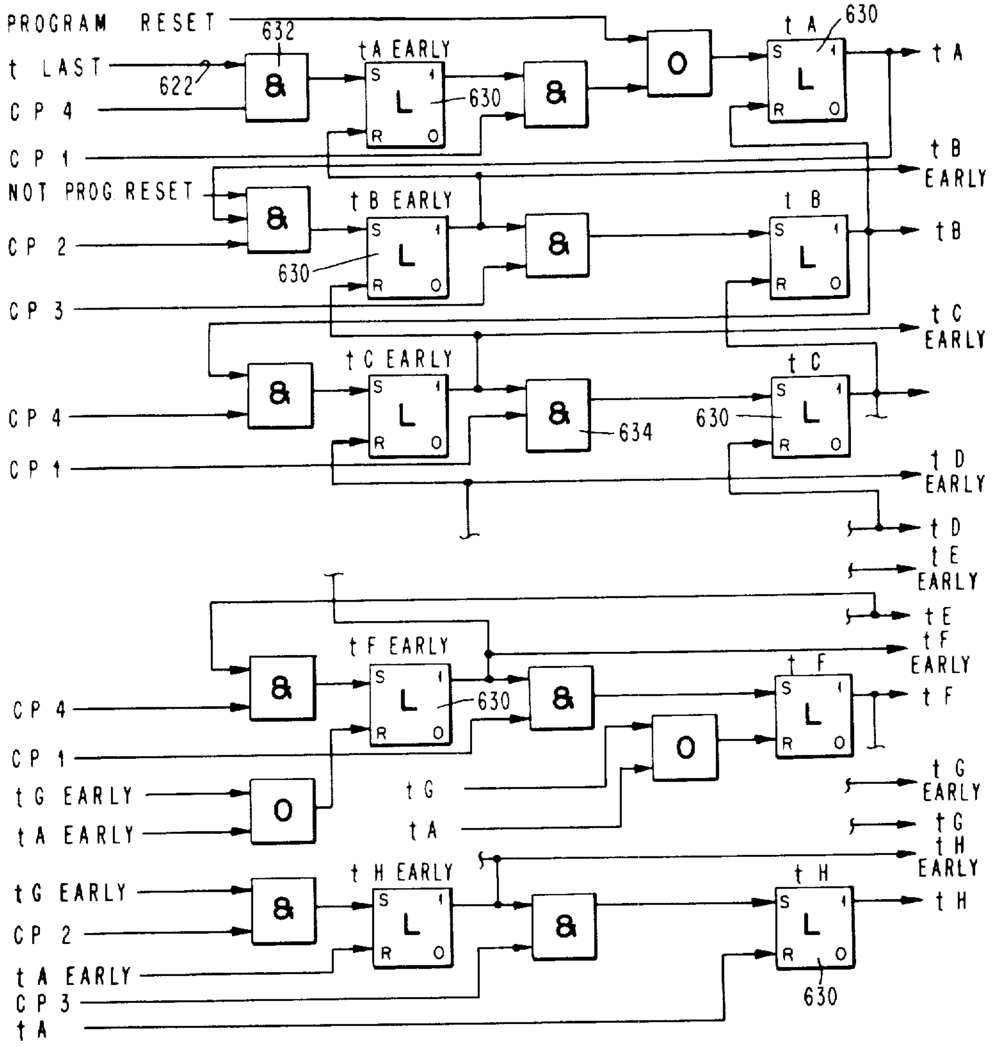
FIG. 9 TIMING NOMENCLATURE EXAMPLES
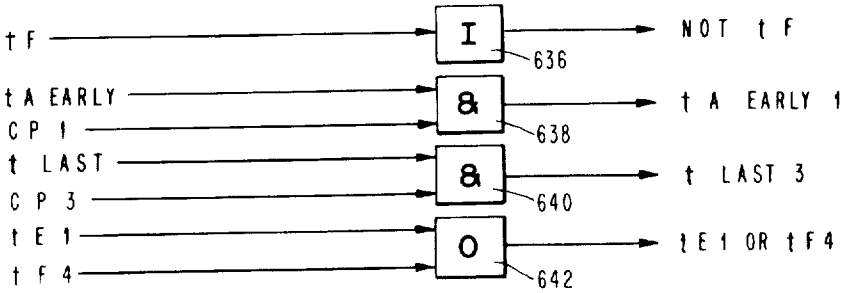

FIG. 10 BINARY GATES FOR CLOCK
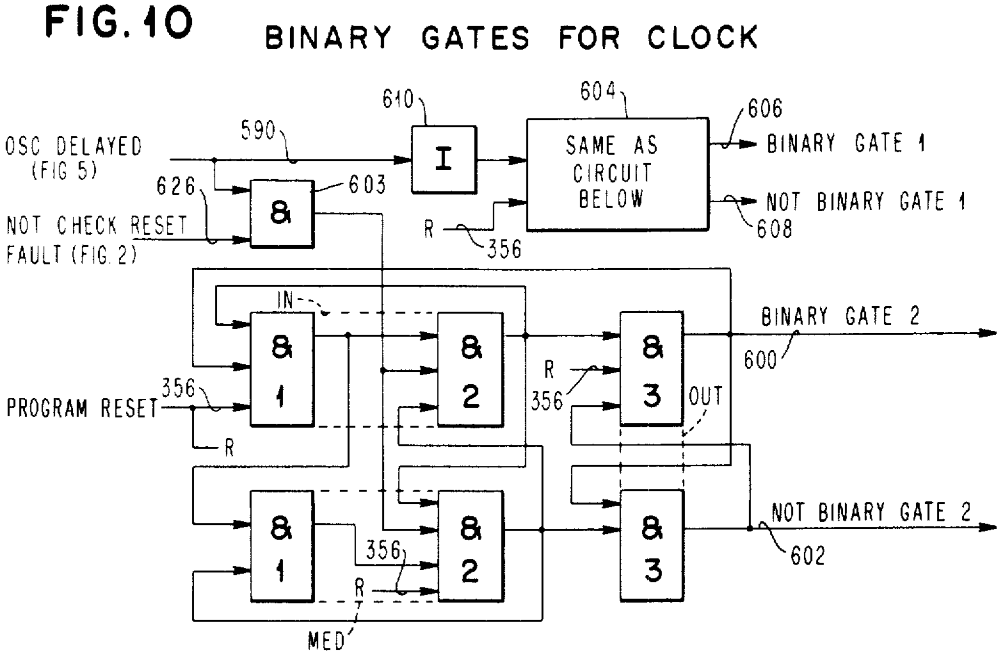
FIG. 11 CLOCK PULSES 1-4
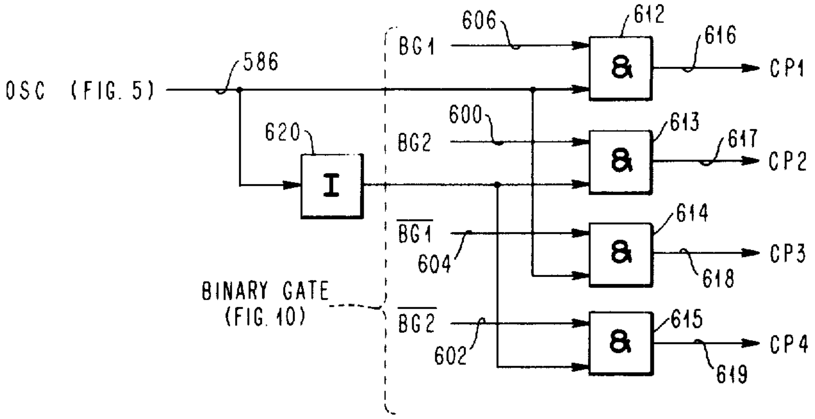

INVENTORS
RICHARD S. CARTER
JAMES C. COOPER
WALTER W. WELZ
BY Melvin P. Williams
ATTORNEY United States Patent Office 3,245,048
Patented Apr. 5, 1966

3,245,048

COMPUTER CLOCK PHASE LOCK

Richard S. Carter, James C. Cooper, and Walter W. Welz, Poughkeepsie, N.Y., assignors to International Business Machines Corporation, New York, N.Y., a corporation of New York Filed Dec. 23, 1963, Ser. No. 332,766
2 Claims. (Cl. 340—172.5)

This invention relates to data processing systems, and more particularly, to the phase locking or control of a computer clocking system.

In the prior art, it has long been known to be desirable to have clocking circuits for causing a computer to advance through successive necessary steps in the performance of computations and other data manipulations. Also, it has long been recognized that whenever the computer is stopped due to errors, or termination of operations for a particular period, the computer must be able to be started with all of the clocking circuits operating in a known phase relationship. Most computers of the prior art utilize ring circuits which advance from one step to another in dependence upon an oscillator or basic clock. The advancement of the ring circuits is under the control of a trigger or multivibrator which generates two signals of equal duration, one after the other.

With increasing speeds, it becomes more difficult to develop ring circuits which will operate properly with only two successive clocking pulses as before described. Thus, the higher speed clocking circuits may utilize high speed rings which include setting and resetting by more than two pulses. In order to achieve this, it is necessary to provide additional logic circuits in order to combine the various clock pulses and timing ring stages so as to cause further clock pulses and subsequent timing ring stages as necessary in order to cause the computer to progress properly. In the case of simple ring stages and alternative clock pulses for controlling the ring, it is possible to force the ring to a particular starting position whenever the machine has been stopped, and it is also possible to force the alternative clocking signal generator to generate one of the clock positions by the well known means of "pulling over" the trigger or multivibrator so that one particular stage will be on without regard to the normal input thereto. When high speed complex clocking circuits are utilized, these methods of forcing a known clock relationship are no longer applicable.

Therefore, it is the primary object of this invention to provide a high speed clocking circuit utilizing a number of clock signals to cause the computer to cycle, said clocking circuit being capable of being set into a known relationship whenever the machine is stopped.

Another object is to provide a high speed logical clock circuit for a computer which is capable of being forced into a known relationship in response to different types of errors or faults which may cause a machine shutdown.

A further object is to provide an improved high speed logical clocking circuit utilizing wide gates or pedestals for generating the necessary clock pulses so as to eliminate circuit races and noise pulses, while maintaining an ability to assume a known phase relationship as the result of stopping, so that proper clocking signals will be available when the computer is restarted.

This invention is predicated on the concept that signals which can cause the machine to stop, such as error and fault signals, may be utilized to cause clocking circuitry of the computer to be rendered partially inoperative in a particular fashion as the machine is brought to a stop, thereby having these clocking circuits in a proper relationship so that the machine can be started with the clocking circuits assuming known sequential conditions; and is further predicated on the concept that if the clocking circuits are not rendered completely inoperative, they may be used to control the phasing-in of the starting of the computer so that it will bear a known relationship to the conditions of the clocking circuits which were established when the machine was shut down.

In accordance with the present invention, the logic circuits which cause the computer to respond in a useful fashion include a main cycle clock and a series of timing pulses which control the main cycle clock. The timing pulses are generated by combinations of oscillator pulses (both positive and negative) and gates or pedestals (both positive and negative). The gates, or pedestals, are generated by delayed oscillator signals, and comprise signals of one-half of the frequency of the oscillator signals. When the machine is stopped as a result of fault or error, the delayed oscillator signal which generates one of the gates or pedestals is blocked, thereby preventing that pedestal from changing; this blocking occurs at a particular time so that it is known that the blocked pedestal will be maintained in a particular condition. The other pedestal is allowed to progress, but the error signals thereafter force the oscillator signals to look positive at all times, thereby forcing the delayed oscillator signal to look positive so that ultimately both gates or pedestals cease to be generated, and the series of clock signals are no longer generated; a particular clock signal (which results from the forced positive oscillator, and the gate or pedestal frozen in the condition as stated above) will be the only clock pulse generated. Thus, the machine is shut down with a known gate or pedestal, and a known clock pulse being generated, and with the oscillator and delayed oscillator signals both appearing in a steady state condition, both positive. When the machine is to be restarted, the start is effected by eliminating a stop signal which exists throughout the time the machine is stopped. In order to cause this to occur in a known relationship with the basic multivibrator (which generates the oscillator signal), the multivibrator is not blocked during the stop, but is allowed to generate a raw oscillator signal which is utilized to time the resetting of the stop latch, so that stop will disappear when the raw oscillator (the basic multivibrator) is in the same state as the forced oscillator and oscilaltor delayed (positive).

This invention permits organized stopping and restarting of a computer of the type having a high speed logical clock utilizing pedestals and logical circuits to generate a series of timing signals for running the basic logic clock or rings in the computer. The clock phase lock system in accordance with the present invention is relatively simple, inexpensive, and reliable.

The foregoing and other objects, features, and advantages of the invention will be apparent from the following more particular description of a preferred embodiment thereof, as illustrated in the accompanying drawings.

In the drawings:

FIG. 1 is a simplified block diagram of an ERROR STOP circuit within which the present embodiment may be used;

FIG. 2 is a schematic block diagram of a CHECK TEST circuit in accordance with the present invention;

FIG. 8 is a simplified schematic block diagram, partially broken away, of a main cycle clock, which may be used in an overall computer clocking system that can be blocked by a CHECK RESET FAULT signal generated by the embodiment of the present invention shown in FIG. 2;

FIG. 9 is illustrative of the timing circuits used in the remaining figures;

FIG. 10 is a schematic block diagram of a circuit for generating clocking gate signals, for combination with oscillator signals so as to generate the clock pulses of FIG. 11, as shown in FIG. 4, in dependence upon no CHECK RESET FAULT;

FIG. 11 is a schematic block diagram of a circuit for combining oscillator and gate signals so as to generate clock pulses;

The embodiment of the present invention disclosed herein is also disclosed in a commonly-owned copending application of Richard S. Carter and Walter W. Welz, filed on even date herewith, Serial No. 332,648, to which reference may be made for further details concerning the circuitry disclosed herein, and which represents an environment within which the present embodiment may be employed. The invention is also disclosed in a commonly-owned copending application of William McGovern, entitled "Computer Check Test," Serial No. 332,765, which relates particularly to the CHECK TEST latch and related error stop circuitry disclosed herein.

Figure 12:
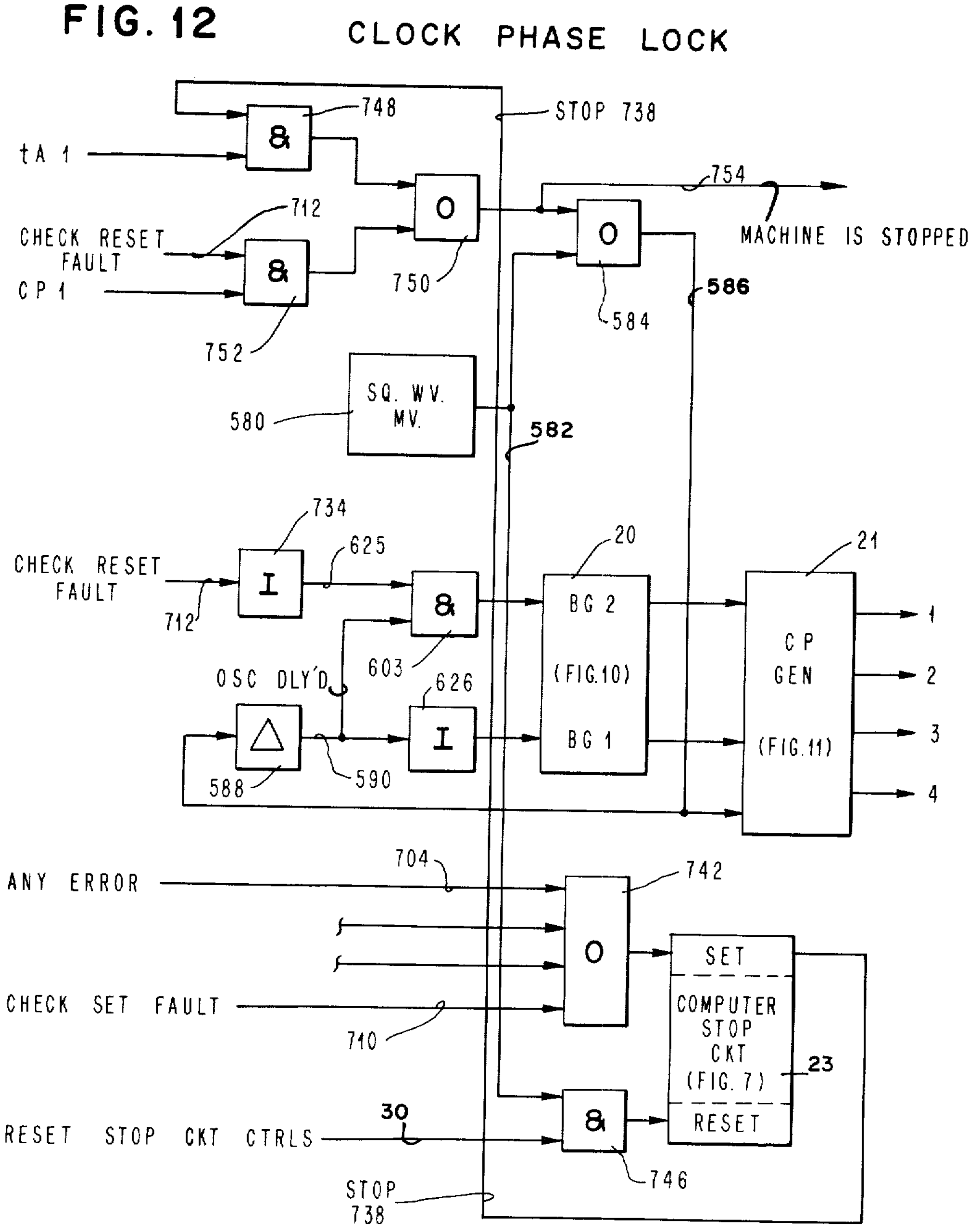
FIG. 12 is a simplified schematic block diagram of a CLOCK PHASE LOCK circuit in accordance with the present invention.

Referring now to FIG. 12 (Sheet 1), a simplified schematic block diagram of an exemplary embodiment of a CLOCK PHASE LOCK circuit in accordance with the present invention is shown. Therein, a SQUARE WAVE MULTIVIBRATOR 580 produces a continuous train of basic clocking signals which comprise a RAW OSCILLATOR signal on a line 582. This signal is passed through an OR circuit 584 to comprise an OSCILLATOR signal on a line 586, which in turn causes a delay unit 588 to generate an OSCILLATOR DELAYED signal on a line 590. The OSCILLATOR DELAYED signal is inverted by an ineverter 626, and passed through a gate 603 so that the output of the circuits 626, 603 will generate binary gate 1 (BG1) and binary gate 2 (BG2) signals in a generator circuit 20 (shown in FIG. 10). The OSCILLATOR signal (586) and the BG1 and BG2 signals (20) are used by a clock pulse generator 21 (shown in FIG. 11) to generate a cyclic series of four clock pulses: CP1, CP2, CP3, and CP4. Whenever a CHECK RESET fault is detected (which is defined hereinafter as a fault in the error checking circuits themselves), a signal on line 712 will cause the inverter 734 to block the AND circuit 603 so that the OSCILLATOR DELAYED signal on line 586 can no longer cause BG2 to be generated. It will be seen in the detailed discussion which follows, that this occurs at such a time that BG2 will be frozen in a positive condition. Since the OSCILLATOR DELAYED signal on line 586 continues to pass through the inverter 626 to generate BG1 signals, the clock pulse generator 21 will be able to generate certain clock pulses, eventually generating CP1. An AND circuit 752 responds to the CHECK RESET FAULT signal and when the clock pulse generator 21 generates the CP1 signal, and the OR circuit 750 will generate a MACHINE IS STOPPED signal on a line 754 which is applied to the OR circuit 584. Thereafter, both the OSCILLATOR signal on line 586 and the OSCILLATOR DELAYED signal on line 590 are positive, as a result of the OR circuit 750 feeding the OR circuit 584.

In case an ANY ERROR is sensed (704), the OR circuit 742 will cause the stop circuit 23 to generate the STOP signal on line 738. Error is defined as erroneous data, but may include other types of errors or faults. Since ANY ERROR is not used to block the generation of BG2 in circuit 20, the clock pulse generator 21 continues to operate in a normal fashion until time A1, where the stop signal in line 738 will pass through an AND circuit 748 and the OR circuit 750 thereby to force an output from the OR circuit 584, and freeze the OSCILLATOR and OSCILLATOR DELAYED signals in a positive condition, as in the case of a FAULT. This is all described in detail hereinafter.

Restarting of the machine is effected by causing the stop circuit 23 to be reset so that the stop signal no longer appears on line 738. This is caused to happen during the same phase of RAW OSCILLATOR (582) as is forced on the OSCILLATOR and OSCILLATOR DELAYED lines 586, 590. The AND circuit 746 which causes resetting of the stop circuit 23 will be able to pass a RESET STOP CIRCUIT CONTROLS signal on a line 30 only when RAW OSCILLATOR signal on line 582 is positive. Therefore, the machine will become unblocked at a time when the SQUARE WAVE MULTIVIBRATOR 580 is delivering a positive signal to the OR circuit 584, so that the next negative swing of the SQUARE WAVE MULTIVIBRATOR 580 will appear on the OSCILLATOR and OSCILLATOR DELAYED lines 586, 590 and will begin to control the circuitry as before described.

Thus, the combination of the RESET FAULT AND circuit 603, 752, the ANY ERROR and SET FAULT OR circuit 742, the AND circuit 748, all in combination with the reset AND circuit 746, provide phase locking of the clock in two types of failure-originated computer stop operations, in accordance with the present invention.

In FIG. 1 is shown a block diagram of an ERROR STOP circuit, within which the present embodiment may be used. Therein, an OR circuit 702 may respond to a plurality of circuits to generate an ANY ERROR signal on a line 704. For instance, the OR circuit 702 may respond to PRIMARY CHANNEL ERROR circuits (not shown elsewhere herein) to RAW CHECK SET FAULT on a line 731 (from FIG. 2), to ADDRESS BUS VALIDITY CHECK circuits (shown in FIG. 115 of the copending application), or to a SECONDARY CHANNEL ERROR signal on a line 434, which is generated in FIG. 3. The ANY ERROR SIGNAL on line 704 is applied to a CHECK TEST circuit 706 and to a COMPUTER STOP circuit 708. These circuits will be described in successive paragraphs. The CHECK TEST circuit 706 also responds to the ADDRESS BUS VALIDITY CHECK circuit 1306 and to the SECONDARY CHANNEL ERROR signal on line 434, and operates to generate a CHECK SET FAULT signal on a line 710 and a CHECK RESET FAULT signal on a line 712 (which is symbolic also of the NOT CHECK RESET FAULT SIGNAL on line 626, as shown in FIG. 2). The COMPUTER STOP circuit 708 responds to the ANY ERROR signal on line 704, the CHECK SET FAULT signal on line 710, a PROGRAM RESET SIGNAL on a line 356, and an OPERATOR STOP signal on a line 700. The COMPUTER STOP circuit 708 generates a STOP signal on a line 714.

The CHECK TEST circuit 706 is shown in FIG. 2. The object of this circuit is to insure that the ordinary validity and error checking circuitry, throughout a system, is operating correctly; that is, to insure that lack of an error signal means that there has been no errors, and cannot mean that perhaps one of the error checking circuits is itself disabled.

Figure 6:
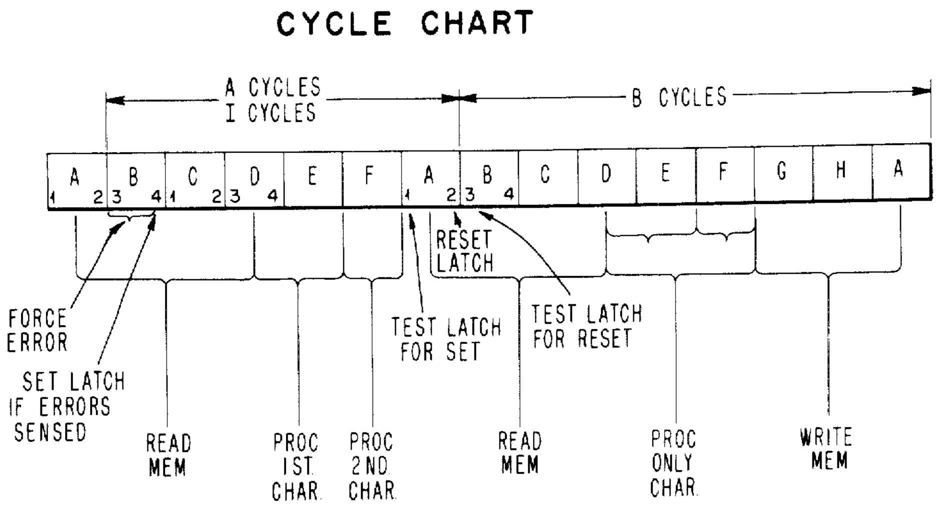
FIG. 6 is a cycle chart illustrating the timing of the present invention.

The CHECK TEST circuit of FIG. 2 comprises essentially a latch 720 which is set by an AND circuit 722 in response to the ADDRESS BUS ERROR signal on line 724, the ANY ERROR signal on line 704, the SECONDARY CHANNEL ERROR signal on line 434, and time B4 (see FIG. 6 for timing indications). Thus, the concurrent presence of ANY ERROR, ADDRESS BUS ERROR, SECONDARY CHANNEL ERROR (and any other errors as may be provided in a particular embodiment), causes the AND circuit 722 to set the CHECK TEST latch 720. ANY ERROR is applied to the AND circuit 722 to be sure that the error-collecting OR circuit is not blocked in an inoperative condition. It is to be noted that the AND circuit 722 operates only at time B4; at a later time, when the time B4 input is no longer present, the AND circuit 722 must be disactivated, thereby providing no input to an inverter 726, so that there will be an input to an AND circuit 728. At a following time, A2, the AND circuit 728 will reset the latch 720.

Thus, the CHECK TEST latch 720 must be set during time B4 due to the concurrent presence of all errors, and must be reset at time A2 due to the lack of an error indication from the AND circuit 722. The reason for this is that all of the checking circuits have errors forced into them during time B4, to be sure that the error checking circuitry can recognize the errors therein. Then, in order to insure that the AND circuit 722 has not been disabled, or frozen, in the ON condition, it is required that the lack of a signal out of the AND circuit 722 will reset the latch, at time A2, by the inverter 726 and the AND circuit 728. Instead of the inverter 726, the lack of an output from AND 722 would (in an actual machine) be used with a $-tA2$ in a negative AND circuit in place of the AND 728. This would enhance failsafe operation of the circuit. An AND circuit 730 is provided to test the out-of-phase output of the latch 720 at time A1; if the latch is not set, there will be a signal from said out-of-phase output (RAW CHECK SET FAULT on line 731), and the AND circuit 730 will then generate the CHECK SET FAULT signal on line 710. However, if all circuits are operating properly, then the CHECK TEST latch 720 will be set at time A1 (it having been set at the previous time B4). Immediately following the testing of the latch to see if it is properly set (at time A1), the AND circuit 728 will respond to the time A2 signal to reset the latch. Thereafter at time B in the following cycle, and AND circuit 732 will test the latch to be sure it is reset. If the latch is not reset at the start of time B (which just precedes a second time B4), then the AND circuit 732 will generate a CHECK RESET FAULT signal on line 712. Thus, when errors are forced into the circuit at time B4, the latch should be set if everything is operating properly. At the following time A1, an AND circuit 730 tests the latch and will generate a CHECK SET FAULT signal on line 710 if the latch did not set properly. Immediately thereafter, the latch should be reset by AND circuit 728, and this is tested by AND circuit 732 which will generate a CHECK RESET FAULT signal on line 712 if the latch is not properly reset at time B. The CHECK RESET FAULT signal on line 712 is passed to an inverter 734 which generates the NOT CHECK RESET FAULT signal on line 626. In an actual machine, a negative AND circuit would be used in place of the AND circuit 603 (FIG. 10) so as to eliminate the inverter 734, for a more fail-safe operation.

The RAW CHECK SET FAULT signal on line 731 is supplied directly to the ERROR STOP circuit (FIG. 1) so as to cause a general error shut-down, as described hereinafter, in case of failure of the AND circuit 730.

Although the cycle chart of FIG. 6 shows FORCE ERROR in the A and I cycles, the error circuits are forced throughout every time B. Similarly, the sets, resets and tests occur at every time B4, A2, and A1 and B, respectively.

Figure 3:
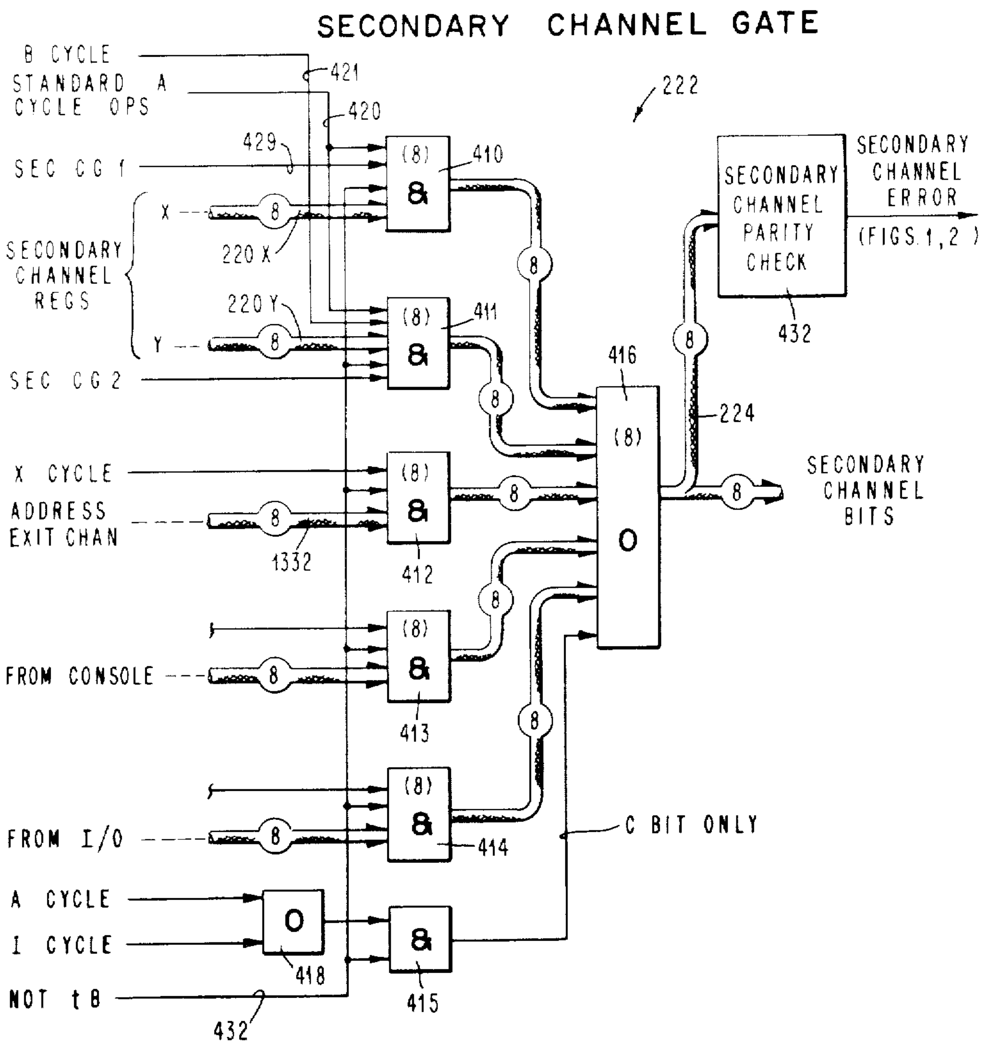
FIG. 3 illustrates a GATE circuit having ERROR CHECKING means, and means for forcing errors at a particular time for use with the embodiment of the invention shown in FIGS. 1 and 2.

The SECONDARY CHANNEL ERROR signal on line 434 is generated in FIG. 3. The SECONDARY CHANNEL GATE comprises a plurality of eight way gates 410–414 which feed in eight way OR circuit 416. The output of the SECONDARY CHANNEL GATE 210 comprises the SECONDARY CHANNEL 224, which includes one bit for each of the bits in a character. For further details, see the aforementioned copending application.

Attached to the SECONDARY CHANNEL is a SECONDARY CHANNEL PARITY CHECK circuit 432 which generate a SECONDARY CHANNEL ERROR on the line 434 whenever there is other than an odd number of bits on the SECONDARY CHANNEL. The SECONDARY CHANNEL PARITY CHECK circuit 432 can be any parity checking circuit well known in the art, the details of which are not important here.

An AND circuit 415 is provided in order to create proper parity on the SECONDARY CHANNEL at times when there is no data actually transferred to the SECONDARY CHANNEL. Thus during an A cycle (450), when A fields are accessed and put into the A registers, and during an I cycle (452), not data is transferred to the SECONDARY CHANNEL. To prevent the appearance of error during this time, a parity bit is caused to go on the CHANNEL by means of the AND circuit 415 together with an OR circuit 418.

The only thing that will block the gates, 410–415 is the presence of time B, which blocking is accomplished by the disappearance of a NOT *t*B signal. This signal is generated by taking the complement of the time B signal, possibly by means of an inverter (not shown), all as is within the skill in the art (see examples, FIG. 9).

Figure 4:
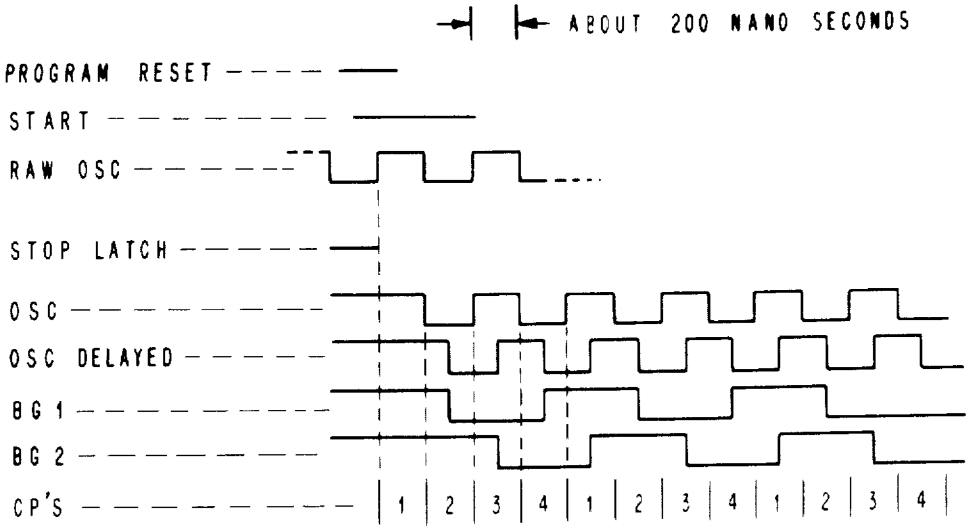
FIG. 4 is a basic timing chart illustrative of the timing of an embodiment within which the present invention may be utilized.

In FIG. 4 is shown a BASIC TIMING CHART which illustrates the relationship of various signals utilized in generating a sequence of four clock pulses. At the bottom of FIG. 4 is shown the clock pulses, which are identified as being 1, 2, 3, 4, 1, 2, 3, 4, etc. These clock pulses are generated (in FIG. 11, hereinafter) by combinations of signals: CP2 is generated in response to negative OSCILLATOR and positive binary gate 2 (BG2); CP3 is generated in response to positive OSCILLATOR and negative BG1; CP4 is generated in response to negative OSCILLATOR and negative BG2; and CP1 is generated in response to positive OSCILLATOR and positive BG1. The circuits which actually develop the OSCILLATOR and binary gate signals, and combine these so as to generate the clock pulses are discussed in detail in the copending application, Section 11. The remainder of the BASIC TIMING CHART of FIG. 4 illustrates the manner in which the basic timing signals resume operation in a known phase relationship following a program reset or error stop, and restarting of the system. This will be described in detail along with the circuits, in a later section.

Figure 5:
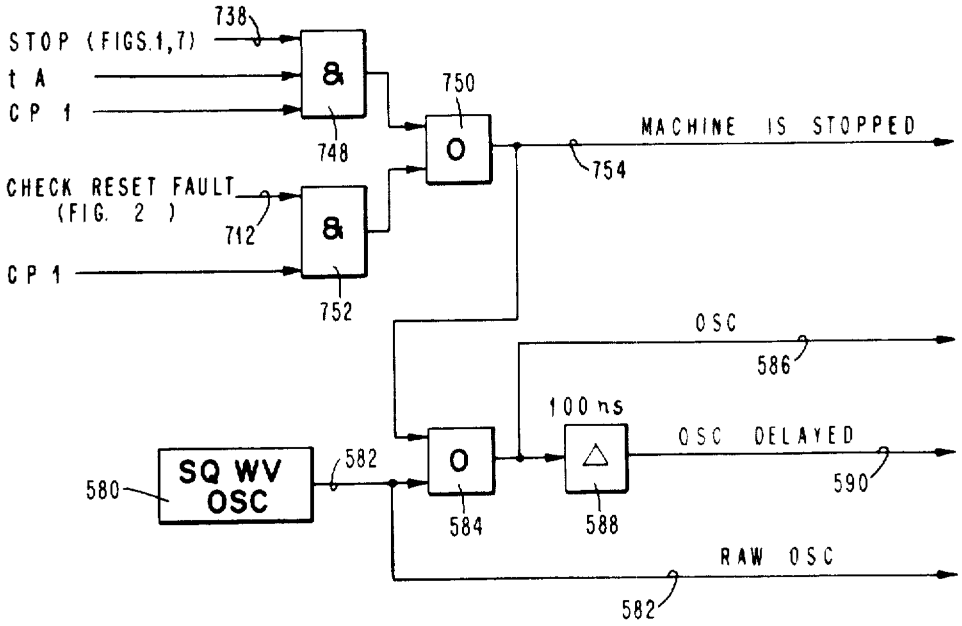
FIG. 5 is a schematic block diagram of an OSCILLATOR circuit which may be blocked by a false signal derived in accordance with the present invention.

The basic OSCILLATOR circuit is shown in FIG. 5. At the bottom left hand side of FIG. 5 is shown a SQUARE WAVE OSCILLATOR 580 which may be of any well known type having a period of approximately 400 nanoseconds; this will give a positive portion followed by a negative portion each of about 200 nanoseconds, as illustrated in the top of the BASIC TIMING CHART in FIG. 4. The details of the SQUARE WAVE OSCILLATOR 580 are not shown because any square wave oscillator known to the prior art, capable of operating at that frequency, is suitable.

The output of the SQUARE WAVE OSCILLATOR 580 on a line 582 comprises a RAW OSCILLATOR signal on a line 582. This RAW OSCILLATOR SIGNAL is also fed to an OR circuit 584, the output of which comprises an OSCILLATOR signal on line 586 which is fed to certain other circuitry and to a delay circuit 588; the delay circuit 588 supplies a delay of approximately 100 nanoseconds, and generates thereby an OSCILLATOR DELAYED signal on line 590. The remainder of the circuits in FIG. 5 are described hereinafter, with respect to the stop circuitry.

Figure 7:
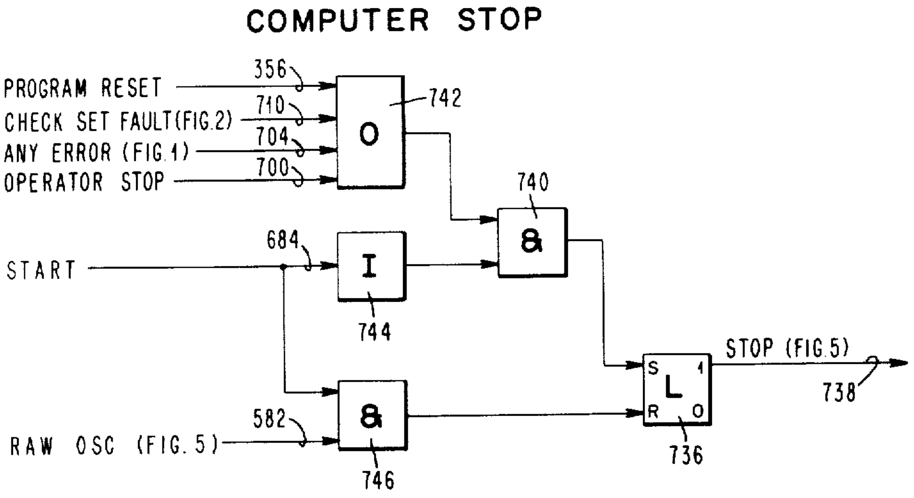
FIG. 7 is a computer stop circuit which may be operated by a check set fault signal from the embodiment of the present invention illustrated in FIG. 2.

A STOP signal on a line 738 is generated in FIG. 7 by a latch 736 which is set by an AND circuit 740 in response to an OR circuit 742 and an inverter 744. The OR circuit 742 responds to any one of the following: PROGRAM RESET on line 356; CHECK SET FAULT on line 710; ANY ERROR on line 704; and OPERATOR STOP on line 700. The inverter 744 responds to the START signal on line 684. Thus, the latch 736 will be set any time that the START signal is not present, whenever there is any one of the four inputs to the OR circuit 742. The latch 736 is reset by an AND circuit 746 in response to the START signal and the RAW OSCILLATOR signal on line 582. The purpose of the AND circuit 746 is to guarantee that a start condition can be initiated only during the positive portion of RAW OSCILLATOR; this insures phase-locking of the circuitry as described hereinbefore, so that CP1 will be the first clock pulse to be generated once the computer is started by the resetting of the STOP signal latch 736.

Returning now to the OSCILLATOR circuit of FIG. 5, the STOP signal on line 738 is applied to an AND circuit 748 together with time A and CP1. Thus, the AND circuit will deliver a signal to an OR circuit 750 at time A1, whenever the STOP signal appears on line 738. The OR circuit 750 can also respond to an AND circuit 752 due to the concurrent presence of the CHECK RESET FAULT signal on line 712 and CP1. Therefore, whenever there is a CHECK RESET FAULT, the OR circuit 750 will be activated; this will be shown hereinafter to occur at what would normally be time C early 1. The output of the AND circuit 750 comprises a MACHINE IS STOPPED signal on line 754, which is applied to the OR circuit 584, described hereinbefore. The purpose of applying the MACHINE IS STOPPED signal to the OR circuit 584 is to cause the oscillator to be apparently frozen in the positive oscillator condition whenever the machine is, in fact, stopped. Thus, starting of the machine always takes place with positive OSCILLATOR on line 586 and positive OSCILLATOR DELAYED on line 590. Notice that RAW OSCILLATOR on line 582 continues to follow the SQUARE WAVE OSCILLATOR 580 so as to provide proper gating for the START signal on line 684 (FIG. 7) in order to permit it to reset the stop latch. It is the disappearance of the STOP signal on line 738 (FIG. 7) which actually causes the machine to begin running again. The MACHINE IS STOPPED signal on line 754 may be utilized as necessary throughout the system to indicate the fact that no computation may be achieved due to the stopping of the oscillator itself, which stopping of the oscillator is actually accomplished by forcing the OSCILLATOR and OSCILLATOR DELAYED signals positive, by means of the OR circuit 584.

Referring now to FIG. 10, a BINARY GATES FOR CLOCK circuits generates the BG1 and BG2 signals as well as the NOT BG1 (or negative BG1) and NOT BG2 signals which are all utilized in FIG. 11 to generate the clock pulses CP1–CP4. In FIG. 10, the OSCILLATOR DELAYED SIGNAL (590) is applied to an AND circuit 603 which permits passing of the OSCILLATOR DELAYED signal only when there is a NOT CHECK RESET FAULT signal on line 626 (from FIG. 2). The OSCILLATOR DELAYED signal on line 590 also feeds an inverter 610 which causes the negative of OSCILLATOR DELAYED to drive the BG1 circuit 604. The operation of the circuit of FIG. 10 is described in detail in said copending application; it suffices here to understand that the circuit is a frequency divider which is phase-locked with the oscillator in such a fashion that there will be a positive BG1 and a positive BG2 at the time that the computer begins to run following an error stop. The effect of the AND circuit 603 is to block the OSCILLATOR DELAYED signal, thereby preventing a change in BG2 whenever there is a CHECK RESET FAULT, due to the disappearance of the NOT CHECK RESET FAULT signal on line 626.

Referring briefly to the cycle chart of FIG. 6, consider that the CHECK TEST latch is to be reset at time A2 at the end of a first cycle. Throughout time B, the AND circuit 732 (FIG. 2) is gated by a *t*B signal, and, assuming that the latch has not been reset (due to a fault in the check test circuit), there will be a CHECK RESET FAULT signal on line 712. This will cause the inverter 734 to cease generating the NOT CHECK RESET FAULT signal on line 626. At the start of time B3 (FIG. 4), BG1 is negative and BG2 is positive. Referring to FIG. 10, since the OSCILLATOR DELAYED signal is applied directly to the inverter 610, BG1 can change, but BG2 can no longer change. Thus, the circuit of FIG. 10 will continue to provide the positive BG2 signal throughout time B, due to the operation of the CHECK TEST circuit in FIG. 2. The CHECK RESET FAULT signal is also applied to the OSCILLATOR circuit of FIG. 5. This signal will cause the MACHINE IS STOPPED signal on line 754, and cause the OR circuit 584 to force the OSCILLATOR and OSCILLATOR DELAYED signals into a steady positive condition. However, the CHECK RESET FAULT will not operate the AND circuit 752 until CP1. Referring to the BASIC TIMING CHART of FIG. 4, and to the CLOCK PULSES 1–4 circuit of FIG. 11, it will be seen that when BG1 is frozen positive at time 3, the next negative swing of the OSCILLATOR (which looks like it will occur at time 4) will actually cause the generation of CP2, due to the fact that positive BG2 and negative OSCILLATOR cause an AND circuit 613 (FIG. 11) to generate CP2. The next thing that will occur is that BG1 and the oscillator both go positive, thus causing CP1 to be generated. As soon as CP1 is available to the AND circuit 752 (FIG. 5) the OR circuit 750 causes the OR circuit 584 to force the OSCILLATOR signals positive. Therefore, the machine is shut down, with BG1 ON, BG2 ON (FIG. 10), and CP1 being generated, due to the fact that the OSCILLATOR is forced positive by the OR circuit 584. In order to achieve this, the clock counted as follows: A1, A2, B3, B2, B1. This is so because the MAIN CYCLE CLOCK cannot advance into time C EARLY without CP4, and CP4 cannot be generated with negative BG2.

Thus there has been described a combination of timing signals and start-stop signals together with the CHECK TEST CIRCUITRY of FIG. 2 which controls the starting, stopping, checking and running of the machine, and which keeps all of these functions phase-locked in such a fashion that whenever the machine is started, CP1 will be the first clock pulse to be generated, as shown in the basic timing chart of FIG. 4. This in turn guarantees that time A will be set whenever the machine is restarted as is illustrated in the main cycle clock discussion with respect to FIG. 8, hereinafter.

The main cycle clock causes the division of actual operating cycles into logic times, so that the various steps may proceed in an orderly manner. The cycle clock runs from a time A to a time F unless the memory is to be loaded, in which case it runs from time A to time H. Running through the cycle clock is considered to be either an instruction cycle (I cycle) or an execution cycle (A, B, or X cycles); the execution cycles can be either of the memory loading type (such as a B cycle within which a result must be written into memory) or of the type where there is no loading of memory required such as an A cycle wherein the memory is regenerated as the characters are handled in preparation for a following B cycle).

FIG. 8 shows the MAIN CYCLE CLOCK which generates a series of early times and times, including times designated from A through H and corresponding times EARLY A through EARLY H. The circuit shown in FIG. 8 is essentially a ring circuit wherein one stage goes on and permits the next stage to go on at a subsequent clock pulse time, and as a stage goes on it resets an earlier stage. For instance, stage *t*B EARLY will rest stage *t*A EARLY. This is discussed in detail in said copending application. Setting of stage *t*B is effected by the combination of *t*B EARLY having been set, and CP3 being applied. The mere fact that *t*B comes on, automatically turns off *t*A.

When the STOP signal disappears from line 738, the OSCILLATOR will be unblocked. The clock will advance from CP1, to CP2 and CP3; but since the MAIN LOGIC CLOCK is still set to time B EARLY and time B, the CHECK RESET FAULT can still be sensed; therefore the BG2 generator is still blocked. Thus, the clock will next generate CP2 and CP1 (in that reverse order) in the same way as when the initial stop occurred at CP1, the OSCILLATOR will be blocked. However, if the PROGRAM RESET switch is pressed (FIG. 39, sheet 24 of said copending application), the MAIN CYCLE CLOCK is reset to *t*A, so that a complete new cycle can be performed.

The details of the MAIN CYCLE CLOCK are discussed more fully in Section 11 of said copending application.

In order to simplify the description, the timing signals are combined in such a way as to specify an exact time, as illustrated in FIG. 9. For instance, if an occurrence is to be permitted at all times except during a particular time, it might be indicated as, for instance, NOT *t*F; it is to be understood that such a time may be generated by taking the out-of-phase output of any one of the latches shown in FIG. 8, or by passing the timing signal, such as *t*F, through an inverter, such as the inverter 636 in FIG. 9. Similarly, any clock pulse may be combined with any logic time so as to generate a signal such as *t*A EARLY 1 by means of an AND circuit 638. Also, the timing signal *t* LAST may be combined with clock pulses so as to specify a particular portion of *t* LAST; this may be achieved by an AND circuit such as AND circuit 640 which generates *t* LAST 3. It should be understood that any combinations of signals, or the complements of the signals, may be made throughout the embodiment, and the generation of these signals is, in most cases, left to the skill of the art.

The foregoing embodiment is particularly concerned with first blocking the BG2 signal, thereafter forcing the OSCILLATOR and OSCILLATOR DELAYED signals positive, and then causing the STOP circuit of FIG. 7 to be reset only during positive RAW OSCILLATOR. The circuits shown are exemplary only, and it is possible to utilize the positive and negative portions of the square wave multivibrator in such a fashion that the resulting signals may be considered to be first oscillator and second oscillator, one being the inverse of the other, thereby eliminating the inverter 626 which feeds the BG1 generating circuit as shown in FIG. 10. Other simplifications and improvements might be devised, the particular embodiments shown herein being developed for simplicity of illustration of the invention.

What is claimed is:

1. In a data processing system of the type within which various means may sense errors or failures in said system, and there is provided means for generating fault signals in response to certain errors or failures, said system being resettable into a running condition by a system resetting signal, a timing control comprising:

a source of alternating basic timing signals;

a stop circuit settable into either one of two stable states, said stop circuit when set into a first one of said states generating a stop signal;

clock control means responsive to said source and to said stop signal for generating alternating basic timing signals in response to the absence of said stop signal and for generating a steady signal in response to said stop signal;

timing signal generating means responsive to said clock control means for generating timing signals for said system;

means responsive to said fault signals for setting said stop means in said first state;

and means responsive to said system resetting signals and to said source for resetting said stop circuit into said second condition in response to a signal from said source which is equal to the output from said clock control means at the time that said stop circuit is reset into said second condition.

2. In a data processing system of the type within which various means may sense errors or failures in said system, and within which there is provided means for generating a stop producing signal in response to certain errors or failures, said system being resettable into a running condition by a system resetting signal, a timing control comprising:

a source of alternatively positive and negative basic timing signals;

a stop circuit settable into either one of two stable states for generating a stop signal when set into a first one of said states;

an OR circuit responsive to said source and to said stop signal for generating basic timing signals in response to the absence of said stop signal and for generating a steady positive signal in response to said stop signal;

clock means responsive to said OR circuit for generating a plurality of clock pulses;

an AND circuit responsive to a first one of said clock pulses and to said stop producing signal for setting said stop circuit into said first state;

and means responsive to a positive timing signal from said source and to said system resetting signal for setting said stop circuit into the second one of said states.

No references cited.

ROBERT C. BAILEY, *Primary Examiner.*

G. D. SHAW, *Assistant Examiner.*